UNITED STATES PATENT OFFICE.

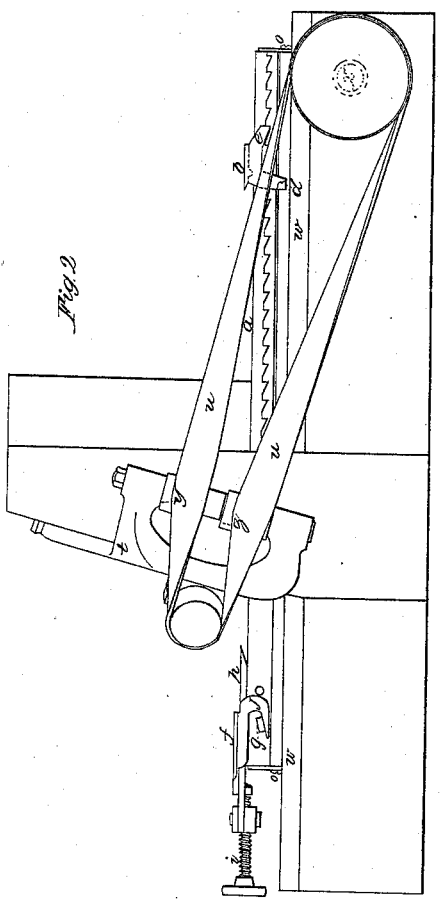
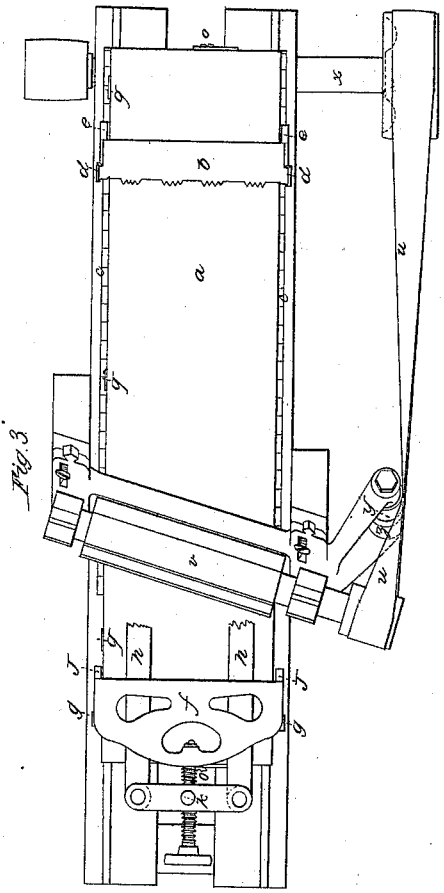
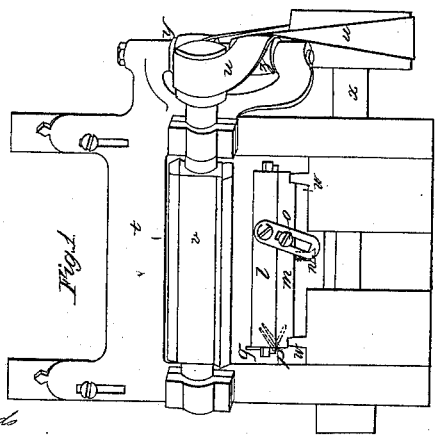

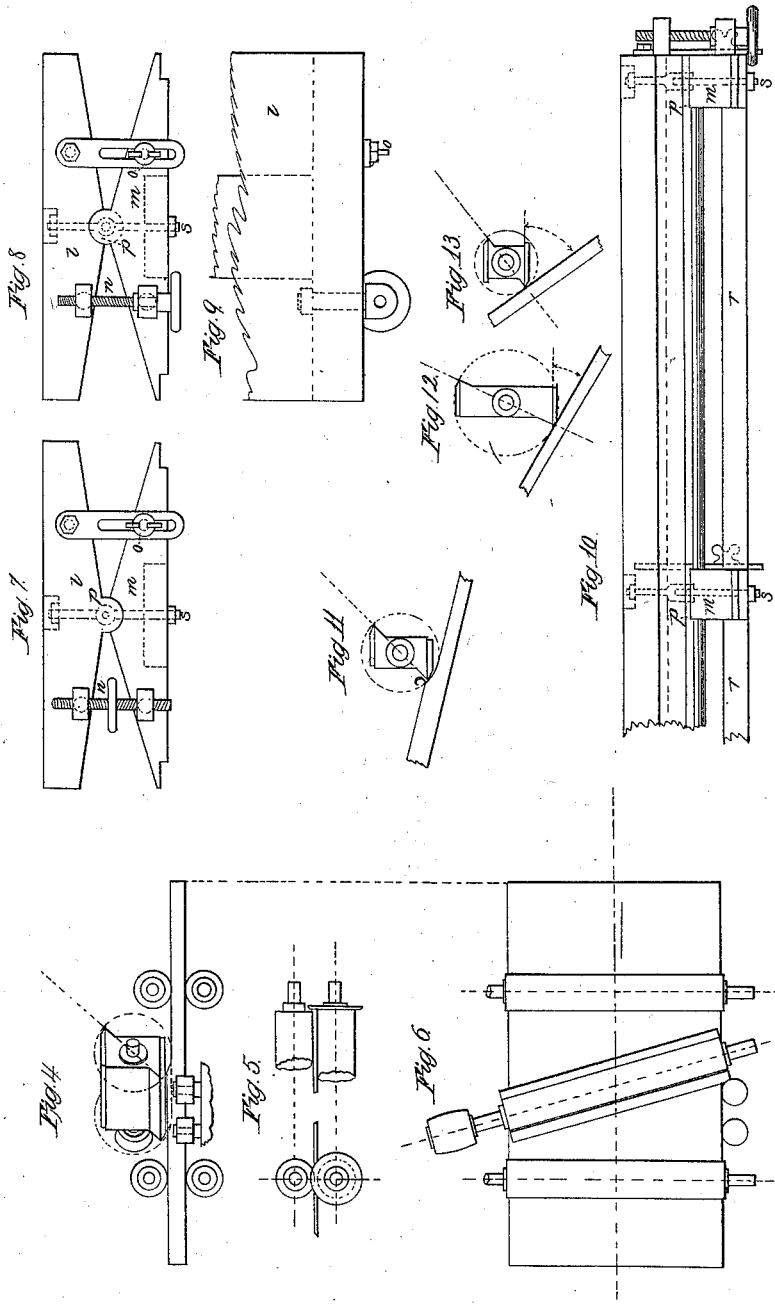

DAVID N. B. COFFIN, JR., OF NEWTON CENTER, AND HENRY D. STOVER, OF BOSTON, MASSACHUSETTS.

DEVICE FOR DOGGING LUMBER IN PLANING-MACHINES.

Specification of Letters Patent No. 17,315, dated May 19, 1857.

*To all whom it may concern:*

Be it known that we, DAVID N. B. COFFIN, Jr., of Newton Center, in the county of Middlesex, and HENRY D. STOVER, of Boston, in the county of Suffolk, both in the State of Massachusetts, have invented certain new and useful Improvements in Planing-Machines for Planing Lumber; and we do hereby declare that the following is a full, clear, and exact description of the same, reference being had to the accompanying drawings, which form a part of this specification, and to the letters of reference marked thereon.

Our improvements relate 1st, to the means for securing the lumber to the platen. 2nd, to the construction of the platen itself so as to make it adjustable for the purpose of planing various angular surfaces.

*Explanation of figures.*—Figure 1, is an end elevation of a machine for "trying out" lumber with a straight platen in which the dogs are not shown. Fig. 2, is a side elevation of the same in which the dogs are shown. Fig. 3, is a plan of the same. Fig. 4, is a side elevation which with Fig. 5, a side and end elevations of rolls and Fig. 6, a plan, illustrate the arrangement of the feed and pressure rolls in relation to the cutting cylinder, and the application of the guiding flange upon the feed roll, and also the guiding side rolls. Fig. 7, is an end elevation of a platen. Fig. 8, is also an end elevation of a platen of which Fig. 9, is a plan, (partial,) and Fig. 10, a side elevation, (ditto). Fig. 11, Fig. 12, and Fig. 13, are end elevations of cutting cylinder.

We now proceed to describe the construction and operation of our improvements in the order previously named.

The platen $a$, is provided with the rack $c$, on each side. The dog $b$, has a narrow rib on its under side and nearest the toothed edge. From each end of $b$, and projecting downward are parts $d$, the lower ends of which turn under the smooth lower side of rack $c$, and just touch it when $b$, rests horizontally upon its rib on the platen. The parts $e$, project downward when $b$, is in this position just far enough to catch safely into the rack $c$. Now as the rib on the under side of this dog and on which it rests is nearest the toothed side and as parts $e$, are on the opposite side they must always by the force of gravity fall upon the rack $c$, when left to themselves so that the operator when he wishes to set this dog has only to bear upon the toothed side so as to raise parts $e$, from the rack and shove it forward as far as he wishes or simply draw it backward and leave it where he wishes and it is ready to hold whenever the lumber is pressed against it which is done by simply setting the other dog as follows. The rear end of the platen is furnished with two pins $g$, fixed in its sides. The cross bar $f$, has at each end a part $j$ projecting downward and of suitable form to take hold under the pins $g$. Two dogging bars $h$, are connected together at their back ends and to the screw $i$, by nut $k$, and movable joints. The point of screw $i$, is fixed to bar $f$, so as to be free to turn. Parts $j$ where they bear on pins $g$, have inclined surfaces so that on forcing up the dogging bars $h$, by turning screw $i$, the moment they meet with resistance by coming in contact with the lumber, parts $j$, begin to draw upon the pins $g$, and so drawing cross bar $f$, down toward the platen firmly clamp bars $h$, thereto the screw $i$, at the same time forcing their points into the lumber and the lumber forward against dog $b$. The movable joints allow the dog bars $h$, to adjust themselves to any form or position of the end of the lumber. The pin just forward of $j$ see Fig. 2, is to keep them in place when not in use. These dogs are more convenient and hold the lumber more firmly to the bed than any other kind in use.

"*Instep.*"—Various shapes or forms of the instep above named have been adopted by different individuals and some of them have been patented but we are satisfied that none of them are so perfect in their operation nor so universal in adaptation to the various circumstances and conditions in which they are required to serve as the one we describe nor are any, more definite in their character. The form we describe is illustrated by the Figs. 11, 12, and 13, and its working surface is defined by a radial line drawn from the axis of the cutter head or cylinder to a point in the face of the cutter as near the edge as may be required.

Having thus described and illustrated our improvements, what we claim as our invention and desire to secure by Letters Patent is as follows:

1. We claim the bar $b$, constructed and arranged substantially as set forth in combination with the rack *c*, or its equivalent.

2. Also the device for the rear end of the platen so constructed and arranged that the dogging-bars are clamped firmly to the platen at the same time that they adjust themselves to the form and position of the end of the lumber, by the operation of a single screw substantially as described.

DAVID N. B. COFFIN, Jr.
HENRY D. STOVER.

Witnesses:
FREDK. RICHARDS,
G. M. NASH.